United States Patent [19]

Coffman

[11] Patent Number: 4,790,972

[45] Date of Patent: Dec. 13, 1988

[54] METHOD FOR STACKING BILLETS AND THERMOFORMING

[75] Inventor: Paul M. Coffman, Houston, Tex.

[73] Assignee: Rampart Packaging Inc., Williamsburg, Va.

[21] Appl. No.: 863,753

[22] Filed: May 16, 1986

[51] Int. Cl.⁴ .................. B29C 51/14; B29C 65/02
[52] U.S. Cl. ......................... 264/152; 264/153; 264/160; 264/297.4; 264/297.5; 264/DIG. 57
[58] Field of Search ............ 264/152, 153, 160, 297.1, 264/297.2, DIG. 57, DIG. 67, 512, 297.5, 297.8, 297.4; 156/222, 224, 264, 182, 244.18, 265, 267

[56] References Cited

U.S. PATENT DOCUMENTS

| | | | |
|---|---|---|---|
| 700,656 | 5/1902 | Kempshall | 156/224 |
| 1,590,347 | 6/1926 | Cooke | 264/152 |
| 1,912,931 | 6/1933 | Clay | 156/224 |
| 2,268,703 | 1/1942 | Dickey | 264/152 |
| 2,586,446 | 2/1952 | Stockburger | 156/224 |
| 2,618,311 | 11/1952 | Parker | 156/264 |
| 2,907,612 | 10/1959 | White | 156/222 |
| 3,318,748 | 5/1967 | Hurst | 156/224 |
| 3,962,006 | 6/1976 | Saito et al. | 264/152 |
| 4,145,240 | 3/1979 | Polzin | 156/224 |
| 4,374,795 | 2/1983 | Keilp et al. | 264/153 |
| 4,471,018 | 9/1984 | Kritchevsky et al. | 156/222 |

Primary Examiner—James Lowe

[57] ABSTRACT

This invention encompasses a process for making containers from multiple stacked billets which comprises the steps of preparing thermoplastic sheet, cutting or punching billets from the sheet, stacking two or more of the billets together, heating the stacked billets or the mating surfaces of the billets to or above the fusion temperature of the mating surfaces, where the billets adhere to each other, and thermoforming the stacked billets into containers.

4 Claims, 3 Drawing Sheets

METHOD FOR STACKING BILLETS AND THERMOFORMING

BACKGROUND OF THE INVENTION

This invention is a method for making containers from multiple stacked billets. The more layers one is attempint to coextrude, the more difficult coextrusion is and more expensive the coextrusion equipment. In many typical coextrusion processes, three, five or seven layers of materials are coextruded through one coextrusion die. Oftentimes there is a barrier layer material which comprises one or more of the coextrusion layers. The barrier layer material is extremely important in that it protects the contents of the container from moisture, oxygen and other gases and from escaping aromas and flavors. Problems arise when the barrier layer contains a hole or is torn, or for some reason, is a discontinuous layer in the coextruded five, seven or nine layer sheet. A flawed barrier layer may lead to product loss or contamination. Thus, the entire extruded sheet containing the flawed barrier layer must be discarded.

To minimize this risk, it would be advantageous to have two distinct and separate sheets, each with barrier layers. In the event one of the barrier layers is flawed, the other barrier layer provides adequate protection. In this sense the container is provided with double protection by barrier layers. The present idea is to make billets of more layers by producing coextruded billets of a few layers and then stacking them in such a way that they adhere to each other and can be formed into a single product, instead of attempting to coextrude many different layers and then forming the sheet into the product.

It is simpler to make a three or five layer coextrusion than a nine layer coextrusion. In addition, it is easier to heat a *thin* sheet in the oven than a *thick* sheet. The idea of the present invention permits one to make multiple barrier layer materials from a single coextrusion line instead of necessitating two different coextrusion lines or multilayered dies. Coextrusion is also limited because it requires thick outer surface layers. The uter layers usually need to be at least 10 percent of the total layers in the extruded sheet. With the present invention, an outer layer as low as 1 percent thickness of the total layers is sufficient.

SUMMARY OF THE INVENTION

This invention encompasses a process for making containers from multiple stacked billets which comprises the steps of preparing thermoplastic sheet, cutting or punching billets from the sheet, stacking two or more of the billets together, heating the stacked billets or the mating surfaces of the billets to or above the fusion temperature of the mating surfaces, where the billets adhere to each other, and thermoforming the stacked billets into containers.

DETAILED DESCRIPTION OF THE INVENTION

Figure 1:
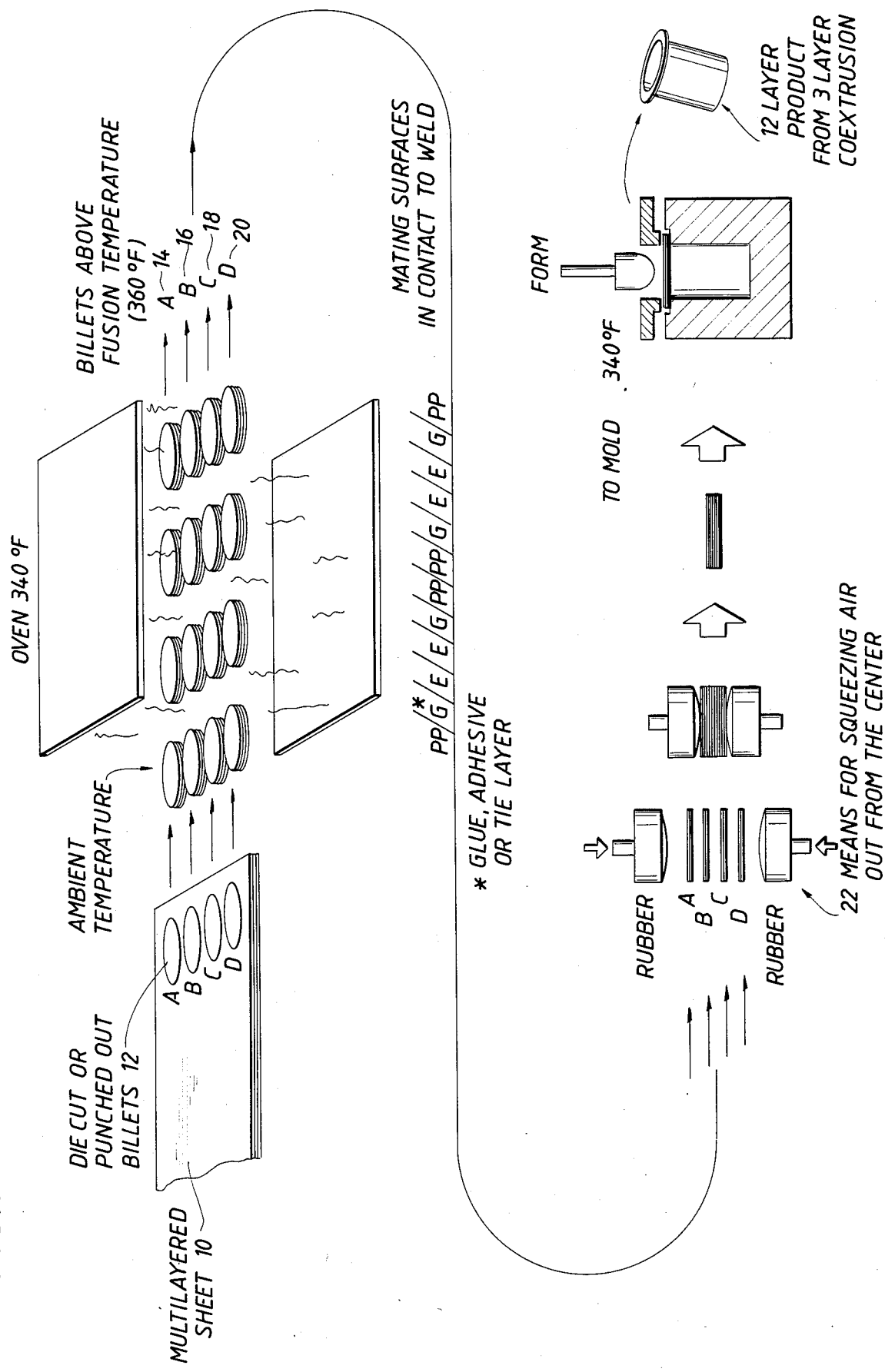
FIG. 1 illustrates a process of making multilayer parts from stacked, coextruded billets.

As may be seen in FIG. 1, multilayered sheet 10 is stacked and billets 12 are stamped out, cut or punched out of sheet 10. Billets are defined as pieces of material cut from thermoplastic sheet, the perimeter of which is cut to match the outer dimensions of the container. Oftentimes billets are round, but they may be square or some other shape. The billets 12 are subjected to 360° F. in an oven to melt or partially melt the like surfaces of the billets 12. Alternatively, the billets may be adhered by spin welding, hot plate welding or any number of other heat methods, to achieve desired adhesion or fusion of the mating surfaces of the billets. The inner layers of the billets, however, need not necessarily be heated to their fusion temperature, (i.e., melting point). Different sets 14, 16, 18 and 20 of stacked billets 12 are stacked and subjected to means 22 for squeezing air out from between the mating surfaces of the billets 12. The stacked billets 24 are then molded at 360° F. They may be solid phase or melt phase pressure formed, solid phase stretched formed or formed by any other thermoforming method. For example, if each stack of billets 12 contained three layers of billets and four stacks were used, a twelve layer product would result from a three layer coextrusion.

Figure 2:
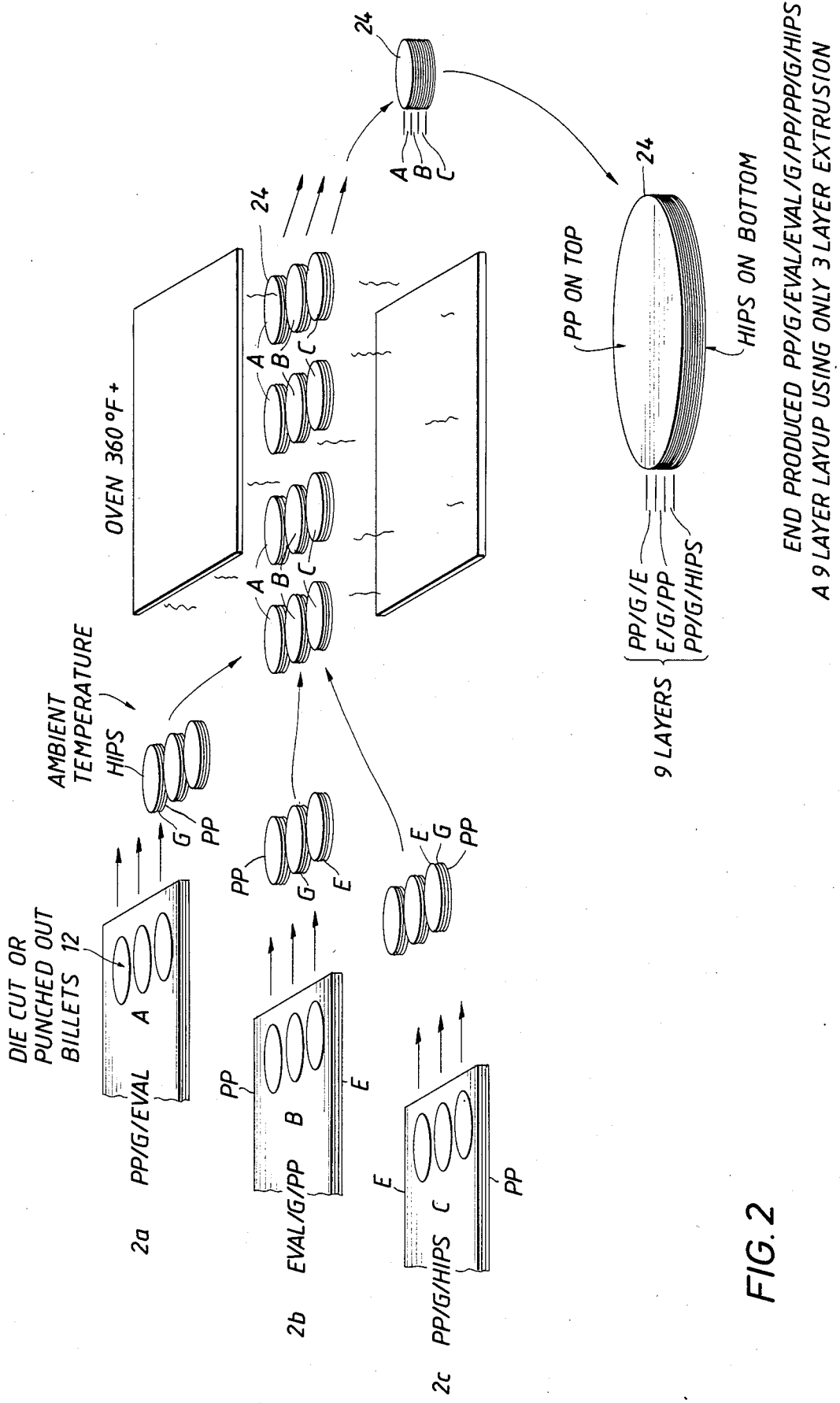
FIG. 2 illustrates the process of combining different coextrusion layups to obtain a special end result.

FIG. 2 represents combinations of different coextrusion layups to obtain a special end result. For example, FIG. 2A shows billets 12 of polypropylene/glue/EVOH. FIG. 2B shows billets 12 of EVOH/glue/polypropylene and FIG. 2C shows billets 12 of polypropylene/glue/HIPS (High Impact Polystyrene). The billets 12 of 2A, 2B and 2C may be combined into one stacked billet 24 wherein the EVOH billets 12 ae in contact with each other and the polypropylene billets are in contact with each other. Thus, a nine layer coextruded billet results from using only a three layer coextrusion.

Figure 3:
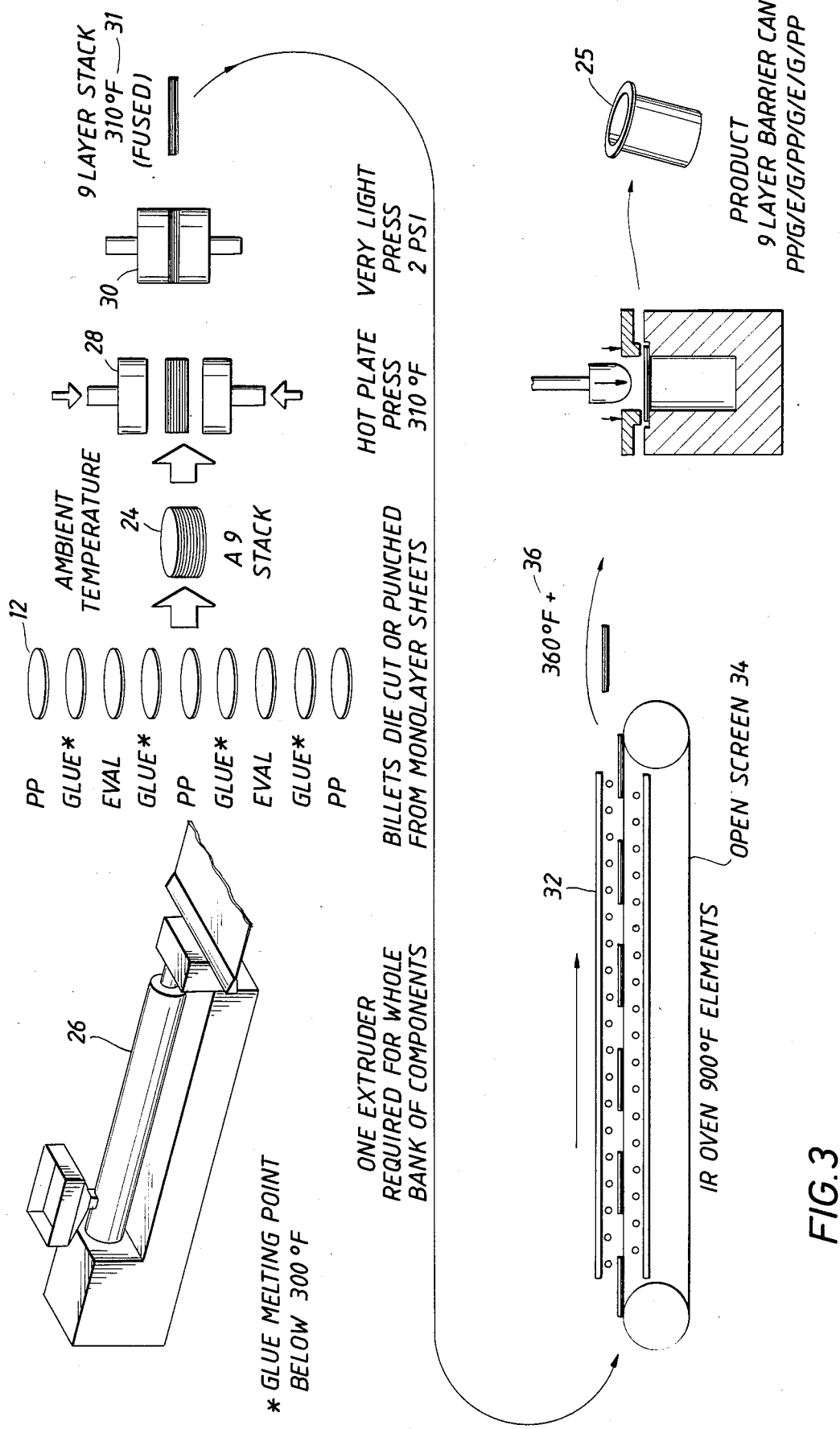
FIG. 3 illustrates the process of making multilayer containers by the billet process with lamination.

FIG. 3 represents multilayer containers 25 made by the billet process with lamination. Only one monolayer extruder 26 is required for the whole bank of components. Billets 12 of polypropylene, of glue and of EVOH ae cut and then stacked. They are subjected to a hot plate press 28 at 310° F. and then a very light press 30 of 2 psi. The nine layer stack 24 is then fused at 310° F. and subjected to an IR oven at 32 at 900° F. with an open screen 34 and heated to 360° F. and then thermoformed to yield a nine layer barrier can product 25. The glue or adhesive should have a melting point below 300° F. The "glue" may be what is referred to as a "tie layer" also.

EXAMPLE 1

Two 50 ml billets each of five layers of polypropylene/Admer (an adhesive available from Mitsui Chemical Co.)/EVAL/Admer/polypropylene were stacked and a heavy gage six ounce juice cup made. The resulting cup product contained ten layers, including two of EVAL. Billets of unlike structure could be stacked additionally; for example, a ten layer structure containing both EVAL and Saran barriers could be constructed.

EXAMPLE 2

Two 50 ml billets each of polypropylene, adhesive, and EVAL are stacked with EVAL against EVAL yielding a five layer structure. A heavy gage six ounce juice cup may be made.

EXAMPLE 3

Two 50 ml billets, each of a three layer EVAL/adhesive/high impact polystyrene, are stacked against an EVAl/adhesive/polypropylene billet, and used to make a heavy gage six ounce juice cup of composition PP/g/E/g/HIPS.

EXAMPLE 4

Two 50 ml, three layer billets of polypropylene/adhesive/EVAl are prepared and stacked with EVAL together to make a 5 layer structure PP/G/E/G/PP or polypropylene/adhesive/EVAL/adhesive/polypropylene is stacked against polypropylene/adhesive/EVAL/adhesive/polypropylene to make 10 layer coextruded billets. Polypropylene adheres to polypropylene and thus is adhesive with respect to itself.

It is necessary that in this stacking, that either the contacting surfaces of the billets stacked together be of the same material, or are in some manner adhesive with respect to each other. This, of course, can be accomplished by the use of an adhesive glue, such as Admer or a tie layer.

What is claimed is:

1. A process for forming containers from billets which comprises the steps of:
    preparing a thermoplastic sheet of a layer of a polypropylene based polymer, an adhesive or tie layer and a barrier layer;
    cutting or punching multilayer billets from said sheet;
    stacking two or more of said billets together;
    heating said stacked billets or the mating surfaces of said billets to at or above the fusion temperature of said mating surfaces of said billets so that said billets adhere to each other; and
    thermoforming said stacked billets into containers.

2. The process of claim 1 which includes the steps of preparing at least one sheet containing at least one layer of a barrier material, cutting or punching billets from said barrier material sheet, and stacking said barrier material billets with two or more of said billets formed of a layer of a polypropylene based polymer, an adhesive or tie layer and a barrier layer.

3. A process for making containers from multiople stacked billets which comprises the steps of:
    preparing at least one thermoplastic sheet formed of coextruded or laminated multilayers containing polypropylene-based polymers, an adhesive or tie layer, and a barrier layer;
    cutting or punching billets from said sheet;
    stacking two or more of said billets together;
    heating said stacked billets or the mating surfaces of said billets so that said billets adhere to each other; and
    thermoforming said stacked billets into containers.

4. A process for making containers from multiple stacked billets which comprises the steps of:
    preparing at least one thermoplastic sheet of a layer of a polypropylene-based polymer, an adhesive or tie layer and a barrier layer;
    preparing at least one thermoplastic sheet of a layer of a polypropylene based polymer, an adhesive or tie layer and a polystyrene layer;
    cutting or punching multilayer billets from said barrier layer and polystyrene layer sheets;
    stacking two or more of said billets together;
    heating said stacked billets or the mating surfaces of said billets to at or above the fusion temperature of said mating surfaces of said billets so that said billets adhere to each other; and
    thermoforming said stacked billets into containers.

* * * * *